United States Patent
Piringer et al.

(10) Patent No.: US 11,703,280 B2
(45) Date of Patent: Jul. 18, 2023

(54) METHOD AND SHAFT FURNACE FOR BURNING CARBON-CONTAINING MATERIAL IN A SHAFT FURNACE

(71) Applicants: MAERZ OFENBAU AG, Zürich (CH); thyssenkrupp AG, Essen (DE)

(72) Inventors: Hannes Piringer, Beinwil am See (CH); Patrick Bucher, Schönewerd (CH)

(73) Assignees: MAERZ OFENBAU AG, Zurich (CH); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/436,715

(22) PCT Filed: Mar. 4, 2020

(86) PCT No.: PCT/EP2020/055742
§ 371 (c)(1),
(2) Date: Sep. 7, 2021

(87) PCT Pub. No.: WO2020/182584
PCT Pub. Date: Sep. 17, 2020

(65) Prior Publication Data
US 2022/0170698 A1    Jun. 2, 2022

(30) Foreign Application Priority Data

Mar. 8, 2019  (BE) .................................. 2019/5148
Mar. 8, 2019  (DE) .................... 10 2019 203 210.9

(51) Int. Cl.
*F27D 7/02* (2006.01)
*C04B 2/12* (2006.01)
(Continued)

(52) U.S. Cl.
CPC ................... *F27D 7/02* (2013.01); *C04B 2/12* (2013.01); *F23L 7/007* (2013.01); *F23N 3/00* (2013.01);
(Continued)

(58) Field of Classification Search
CPC .. C04B 2/12; F23L 7/007; F23L 2900/07006; F23N 3/00; F23N 2221/08; F27B 1/10;
(Continued)

(56) References Cited

U.S. PATENT DOCUMENTS

| | | | |
|---|---|---|---|
| 3,085,022 A | 4/1963 | Koch | |
| 4,747,773 A * | 5/1988 | Predescu | .................. F27B 1/08 432/99 |

(Continued)

FOREIGN PATENT DOCUMENTS

| | | |
|---|---|---|
| CN | 1007752 A | 1/1988 |
| CN | 101008554 A | 8/2007 |

(Continued)

OTHER PUBLICATIONS

English Translation of International Search Report issued in PCT/EP2020/055742, dated Mar. 20, 2020.

*Primary Examiner* — Steven B McAllister
*Assistant Examiner* — Benjamin W Johnson
(74) *Attorney, Agent, or Firm* — thyssenkrupp North America, LLC

(57) ABSTRACT

A shaft furnace for firing carbonate-containing material may include, in a flow direction of the material, a preheating zone, a firing zone, a cooling zone, and a material outlet for discharging the material from the shaft furnace. Burner lances project into the firing zone. At least one burner lance has a first penetration depth into the firing zone and at least one further burner lance has a second penetration depth into the firing zone that is greater than the first penetration depth.

(Continued)

A primary air conduit may be configured to convey combustion air and may be connected to at least one burner lance. An oxygen conduit for conveying oxygen into the firing zone may be arranged such that oxygen flows from the oxygen conduit at least one burner lance having the second penetration depth.

17 Claims, 3 Drawing Sheets

(51) Int. Cl.
    *F23L 7/00*     (2006.01)
    *F23N 3/00*     (2006.01)
    *F27B 1/10*     (2006.01)
    *F27D 99/00*     (2010.01)

(52) U.S. Cl.
    CPC ............ F27B 1/10 (2013.01); F27D 99/0033 (2013.01); *F23L 2900/07006* (2013.01); *F23N 2221/08* (2020.01); *F27M 2003/03* (2013.01); *Y02E 20/34* (2013.01)

(58) Field of Classification Search
    CPC ....... F27D 7/02; F27D 99/0033; Y02E 20/34; Y02P 40/40

USPC .......................................................... 432/18

See application file for complete search history.

(56) References Cited

U.S. PATENT DOCUMENTS

| | | | |
|---|---|---|---|
| 4,859,175 A | 8/1989 | Dreyer et al. | |
| 2001/0029005 A1* | 10/2001 | Piringer | F23B 1/36 |
| | | | 432/19 |
| 2010/0192729 A1 | 8/2010 | Vuletic | |
| 2012/0118107 A1 | 5/2012 | Vuletic | |
| 2018/0283788 A1* | 10/2018 | Habib | F27B 1/10 |

FOREIGN PATENT DOCUMENTS

| | | | | |
|---|---|---|---|---|
| CN | 202390203 U | * | 8/2012 | |
| CN | 202390203 U | | 8/2012 | |
| EP | 1 148 311 A2 | | 11/2005 | |
| EP | 2 908 054 A1 | | 8/2015 | |
| EP | 2908054 A1 | * | 8/2015 | F23C 6/047 |
| GB | 1143014 A | | 2/1969 | |
| JP | 2010-531389 A | | 9/2010 | |
| RU | 2321809 A | | 8/2007 | |
| RU | 144271 U1 | | 8/2014 | |

* cited by examiner

METHOD AND SHAFT FURNACE FOR BURNING CARBON-CONTAINING MATERIAL IN A SHAFT FURNACE

CROSS REFERENCE TO RELATED APPLICATIONS

This application is a U.S. National Stage Entry of International Patent Application Serial Number PCT/EP2020/055742, filed Mar. 4, 2020, which claims priority to German Patent Application No. DE 10 2019 203 210.9, filed Mar. 8, 2019 and Belgian Patent Application No. BE 2019/5148, filed Mar. 8, 2019, the entire contents of both of which are incorporated herein by reference.

FIELD

The present disclosure generally relates to shaft furnaces, including methods for burning carbon-containing material in shaft furnaces.

BACKGROUND

In the firing of particulate material, there is the problem of supplying the required quantity of heat to the material uniformly, so that each particle is fired through to its core without the particles sintering together as a result of local overheating and forming solid bridges in the furnace. This problem is particularly great when relatively high degrees of firing going beyond a soft firing are demanded.

For material to be fired composed of small particles and to obtain a uniform firing and thus product quality, rotary tube furnaces are most suitable since intensive churning of material ensures good and uniform heat transfer to each particle. However, a disadvantage is that the construction of these is very complicated and that the correspondingly high capital costs are added to by high operating costs due to high wear losses and high heat losses via output radiation and exhaust gases, which are particularly pronounced when employing relatively high temperatures as are required for relatively high degrees of firing and other product qualities, such as medium, hard and sintering firing. Rotary tube furnaces are usually suitable only for firing material having a particle size of from 10 mm to 50 mm; smaller and especially larger particle sizes cannot be fired in rotary tube furnaces.

Another method of supplying the quantity of heat required for firing uniformly to the material to be fired is to mix fuel, i.e. metallurgical coke, into the material to be fired in mixed firing furnaces. However, mixed firing furnaces are not suitable for material to be fired having small particle sizes. In addition, they have the considerable disadvantage that the ash from coke combustion remains in the finished fired product and thus leads to a reduced product quality associated with gray coloration. Moreover, mixed firing furnaces have the disadvantage that they produce very high emissions. As a result of the process, mixed firing furnaces lead to formation of a considerable amount of carbon monoxide. In addition, mixed firing furnaces frequently produce very high concentrations of organic hydrocarbons (TOC) and also hydrogen sulfide ($H_2S$).

Shaft furnaces are a further possibility for firing of material. On using the latter, the fuel is introduced through burner lances which dip into the material being fired and are distributed over the shaft cross section. Such furnaces have hitherto suffered from the difficulty, which has not yet been overcome, of achieving a uniform temperature distribution over the shaft cross section and in particular of avoiding sintering together of material being fired due to local overheating.

EP1148311B1 discloses a process for firing carbonate-containing material, in which the burner lances can be moved in order to achieve a uniform firing temperature in the shaft level concerned. However, practical experiments have shown that this method does not achieve its objective. Regions of very high temperatures are usually formed in the regions close to the wall of the shaft furnace, with the regions within the shaft furnace having a significantly lower temperature. As a result of this effect, a homogeneous product quality is not achieved because the material is fired at different temperatures over the shaft cross section. Frequently, the required product quality also cannot be achieved. Furthermore, attempts to achieve the product quality in the middle of the shaft can lead to overheating at the outside of the shaft cross section. Here, for example, material deposits are formed by sintering of dust or fuel ash or melt phases may even be formed. The deposits have an adverse effect on the material flow, which is brought about by gravity. Bridges of material which block passage through the furnace also frequently result from the deposits. In addition, the high temperatures on the outside of the shaft cross section can damage the refractory lining.

Thus a need exists for a shaft furnace and also a process for firing carbon-containing material, in which a uniform temperature distribution over the shaft cross section is achieved in a very simple way.

Figure 1:
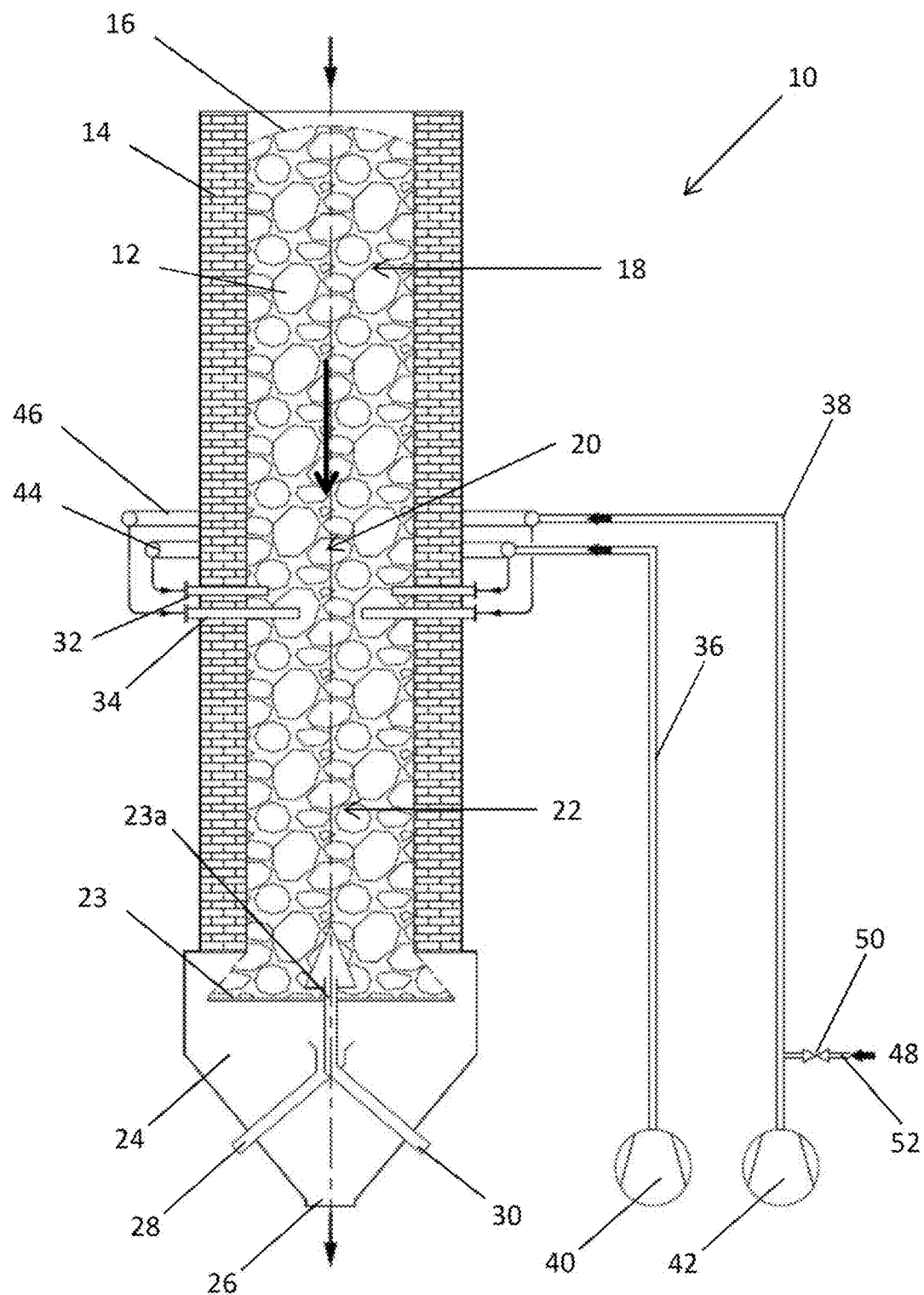
FIG. 1 is a schematic sectional view of an example shaft furnace having an oxygen conduit.

Figure is a schematic sectional view of still another example shaft furnace having primary air preheating.

DETAILED DESCRIPTION

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In a first aspect, a shaft furnace for firing, in particular, carbon-containing material comprises, in the flow direction of the material, a preheating zone, at least one firing zone, a cooling zone and a material outlet for discharging the material from the shaft furnace. The shaft furnace also comprises a plurality of burner lances which project into the firing zone, with at least one burner lance having a first penetration depth into the firing zone and at least one further burner lance having a second penetration depth into the firing zone which is greater than the first penetration depth. The shaft furnace also comprises at least one primary air conduit for conveying combustion air, which air conduit is connected to at least one burner lance. Furthermore, the shaft furnace comprises an oxygen conduit for conveying oxygen into the firing zone, with the oxygen conduit being arranged in such a way that oxygen flows from the oxygen conduit to at least one burner lance having the second penetration depth.

The material to be fired is, for example, a particulate material having a particle size of from 10 to 50 mm, preferably from 40 to 80 mm, in particular from 30 to 60 mm.

The preheating zone preferably directly adjoins a material inlet for the material into the shaft furnace and serves to preheat the material to a temperature of from about 600° C. to 800° C. The firing zone preferably directly adjoins the preheating zone and serves to fire the material, with this preferably being heated to a temperature of from about 1200° C. to 1800° C. The cooling zone preferably directly adjoins the firing zone and serves to cool the fired material to a temperature of, for example, 100° C. The material outlet is, for example, arranged in an outlet funnel adjoining the cooling zone, and the material outlet comprises, for example, a rotary plate or a pusher table for discharging material from the cooling zone into the outlet funnel. The burner lances are preferably tubular and serve to convey fuel into the firing zone.

The oxygen conduit comprises, for example, an oxygen lance which extends into the firing zone of the shaft furnace and has an outlet for discharging oxygen into the firing zone. The oxygen lance is preferably installed on the burner lance having the second penetration depth or directly below the burner lance. It is likewise conceivable for the oxygen lance to run through the burner lance. The burner lance also has, in particular, an outlet opening for discharge of fuel into the firing zone. However, the burner lance is preferably configured so that oxygen flows together with combustion air and fuel through the burner lance.

An oxygen conduit for conveying oxygen into the firing zone offers the advantage of improved combustion of the fuel from the burner lances having the second penetration depth, with it being ensured that a sufficient amount of oxygen is present in the firing zone, preferably at the outlet of the burner lances arranged in the firing zone, to ensure combustion of the fuel. The introduction of oxygen into a burner lance having the second penetration depth also improves combustion of the fuel from the burner lance having the second, deeper penetration depth. This leads to a targeted increase in the temperature in the middle region of the shaft furnace, so that a temperature gradient from the wall region of the shaft furnace to the shaft furnace middle is countered. Such a shaft furnace makes an essentially constant temperature distribution over the cross section of the shaft furnace possible, as a result of which uniform firing of the material in the shaft furnace is achieved.

In a first embodiment, the oxygen conduit is connected, preferably directly, to at least one burner lance having the second penetration depth, so that oxygen for the combustion of fuel flows into the burner lance. In particular, the oxygen conduit is connected to all burner lances having the second penetration depth. The oxygen conduit is preferably not connected to the burner lances having the first penetration depth. In a further embodiment, the oxygen conduit is connected exclusively to the burner lances having the second penetration depth. The burner lance has, for example, an inlet for introduction of oxygen in which the oxygen conduit is arranged. This ensures that the oxygen is conveyed to the burner lance and preferably exclusively to the burner lance having the second penetration depth.

The oxygen conduit comprises, in a further embodiment, a means for regulating the amount of oxygen flowing through the oxygen conduit. The means is, for example, a valve, in particular an adjustable valve. This allows targeted setting of the amount of oxygen in the firing zone of the shaft furnace.

In a further embodiment, the primary air conduit comprises a first primary air conduit for conveying combustion air which is connected to the burner lance having the first penetration depth and a second primary air conduit for conveying combustion air which is connected to the burner lance having the second penetration depth, wherein the oxygen conduit is connected exclusively to the second primary air conduit so that oxygen flows from the oxygen conduit into the second primary air conduit. The first primary air conduit is preferably connected exclusively to the burner lances having the first penetration depth, with the second primary air conduit being connected exclusively to the burner lances having the second penetration depth. This makes it possible to feed different amounts of oxygen to the burner lances having the first and second penetration depths.

In a further embodiment, a further burner lance which has a third penetration depth into the firing zone which is greater than the first and smaller than the second penetration depth is provided and the oxygen conduit is connected to at least one burner lance having the third penetration depth, so that oxygen flows into the burner lance. The oxygen conduit is preferably connected exclusively to the burner lances having the second and third penetration depths and not to those having the first penetration depth.

The means is, in a further embodiment, configured so that the amount of oxygen to the at least one burner lance having the second penetration depth is greater than the amount of oxygen to the at least one burner lance having the third penetration depth. The burner lance having the greatest penetration depth is preferably supplied with the largest amount of oxygen.

The invention also comprises a shaft furnace for firing, in particular, carbonate-containing material, comprising, in the flow direction of the material, a preheating zone, at least one firing zone, a cooling zone and a material outlet for discharging the material from the shaft furnace, a plurality of burner lances which project into the firing zone, wherein at least one burner lance has a first penetration depth into the firing zone and at least one further burner lance has a second penetration depth into the firing zone which is greater than the first penetration depth. The shaft furnace also comprises a first primary air conduit for conveying primary combustion air which is connected to at least one burner lance having the first penetration depth and a second primary air conduit for conveying primary combustion air which is connected to at least one burner lance having the second penetration depth. The second primary air conduit runs at least partly through a preheating device for heating the air in the primary air conduit.

The shaft furnace comprises, for example, a shaft space which comprises the preheating zone, the firing zone and the cooling zone. The preheating device is, for example, an apparatus such as a heat exchanger arranged outside the shaft space for heating the primary air. The abovementioned information and advantages indicated in relation to the shaft furnace also apply to the shaft furnace having the preheating device. The shaft furnace with the preheating device comprises, for example, the above-described oxygen conduit.

Preheating of the primary air of the second primary air conduit offers the advantage of improved combustion of the fuel from the burner lances having the second penetration depth, with it being ensured that an optimum temperature prevails in the firing zone, preferably at the outlet from the burner lances arranged in the firing zone, in order to ensure combustion of the fuel. In addition, the preheating of primary air to a burner lance having the second penetration depth improves combustion of the fuel from the burner lance having the second, deeper penetration depth. This leads to a targeted increase in the temperature in the middle shaft of the shaft furnace, so that a temperature gradient from the wall region of the shaft furnace to the shaft furnace middle is countered. Such a shaft furnace makes an essentially constant temperature distribution over the cross section of the shaft furnace possible, as a result of which uniform firing of the material in the shaft furnace is achieved.

The preheating device comprises, in a further embodiment, the preheating zone within the shaft furnace, with the primary air conduit running at least partly through the preheating zone. In this way, a particularly compact and energy-efficient construction of the shaft furnace can be realized, with the preheating zone serving as heat exchanger with the primary air conduit.

In a further embodiment, the second primary air conduit is connected exclusively to at least one burner lance having the second penetration depth, so that the preheated primary combustion air is fed exclusively to burner lances having the second penetration depth.

The second primary air conduit comprises, in a further embodiment, a plurality of immersion conduits which extend at least partly or completely through the preheating zone. The immersion conduits are, for example, a plurality of concentrically installed pipes having different diameters in which the primary air flows. The immersion conduit has, for example, a U-shape.

The first penetration depth is, in a further embodiment, not more than one third of the radius of the firing zone, in particular from about 5 to 20 cm, preferably from 10 to 15 cm. In a further embodiment, the second penetration depth is about one third of the radius of the firing zone, in particular from about 40 to 80 cm, preferably from 50 to 70 cm, in particular 60 cm.

Such a penetration depth is the optimum depth for making an essentially uniform temperature distribution over the shaft furnace cross section possible.

The invention also comprises a process for firing, in particular, carbonate-containing material in a shaft furnace, where the material flows through a preheating zone, at least one firing zone and a cooling zone to a material outlet, where an introduction of fuel occurs in the firing zone or adjacent thereto via a plurality of burner lances, where at least one burner lance has a first penetration depth and a further burner lance has a second penetration depth which is greater than the first penetration depth and where primary combustion air is conveyed to the burner lances. The process also comprises oxygen being conveyed in addition to the primary combustion air and/or into a primary air conduit for conveying combustion air to the burner lances having the second penetration depth.

The information and advantages indicated in respect of the shaft furnace for firing, in particular, carbonate-containing material apply in process terms to the process for firing, in particular, carbonate-containing material in a shaft furnace.

In one embodiment, the primary combustion air is enriched with oxygen so that it has an oxygen content of from 40% to 90%.

The invention also comprises a process for firing, in particular, carbonate-containing material in a shaft furnace, where the material flows through a preheating zone, at least one firing zone and a cooling zone, where an introduction of fuel occurs into the firing zone or adjacent thereto via a plurality of burner lances, where at least one burner lance has a first penetration depth and a further burner lance has a second penetration depth which is greater than the first penetration depth and where primary combustion air is conveyed to the burner lances, where the primary combustion air is preheated. The preheated primary combustion air is fed exclusively to the burner lances having the second penetration depth. The primary air is preferably conveyed through the preheating zone for preheating.

The information and advantages indicated in respect of the shaft furnace for firing, in particular, carbonate-containing material apply in process terms to the process for firing, in particular, carbonate-containing material in a shaft furnace.

In one embodiment, the primary combustion air is preheated so that it has a temperature of from 250° C. to 500° C.

FIG. 1 shows a shaft furnace 10 for firing, for example, carbon-containing material having a particle size of from about 10 to 50 mm, preferably from 40 to 80 mm, in particular from 30 to 60 mm. The shaft furnace 10 comprises a shaft space 12 which preferably extends in the vertical direction and has, for example, a constant cross section or a cross section which widens in the flow direction of the material being fired. For example, the shaft space 12 has a round, in particular circular, or angular, in particular quadrilateral, cross section. The shaft space 12 is surrounded by a shaft wall 14 which is, for example, made of steel with an adjoining refractory masonry interior wall. The shaft space 12 is open at the top and at the bottom, with the shaft furnace 10 having a material inlet 16 which is configured as upper opening of the shaft space 12 and preferably extends over the entire cross section of the shaft space 12. The material inlet 16 serves for introducing material to be fired into the shaft furnace 10. A further embodiment comprises, instead of the open material inlet 16 depicted in FIG. 1, a material lock which makes it possible to introduce the material to be fired from a material feed device into the furnace shaft, with the material lock having the task of largely preventing entry of ambient air into the top of the furnace. This embodiment is preferably used when the furnace offgas is to have a high carbon dioxide concentration and a low oxygen concentration as is necessary for downstream processes such as milling/drying of coal, beet sugar process, soda process or for the production of precipitated calcium carbonate. The flow direction of the material is denoted by an arrow in FIG. 1 and runs vertically from the top downward through the shaft furnace 10.

In the flow direction of the material, the shaft furnace 10 comprises a preheating zone 18 following the material inlet 16, a firing zone 20 and a cooling zone 22. The cooling zone 22 is followed by the outlet funnel 24 which ends in a material outlet 26 for discharging the material from the shaft furnace 10. In the outlet funnel 24, there is, for example, a discharge device 23 which serves to discharge material from the cooling zone 22 of the shaft furnace 10 into the outlet funnel 24. The discharge device 23 is, for example, a rotating plate or a pusher table. Underneath the material outlet 26, there is, for example, either a tightly closing material discharge flap or, if required, a tightly closing material lock. The material flows essentially under the action of gravity through the shaft furnace 10 and is thermally treated in countercurrent. The height of the shaft space 12 is preferably determined by the process residence times of the material being fired to be determined in conjunction with the setting of the transport speed by means of the discharge device 23. These residence times are distributed over the upper preheating zone 18 adjoining the material inlet 16, the firing zone 20 which follows in a downward direction and the cooling zone 22 which runs to the discharge device 23. The material to be fired is preferably preheated to a temperature of up to about 800° C. in the preheating zone 18, with the firing zone 20 having, for example, a temperature of from 800° C. to 1800° C. and the fired material being cooled back down to about 100° C. in the cooling zone.

The shaft furnace 10 comprises one or more air inlets 28, 30 for introducing air into the shaft furnace 10. For example, two air inlets 28, 30 are arranged in the shaft furnace 10 of FIG. 1 and introduce air into the outlet funnel 24 and also into the displacement body 23a. The air is preferably blown into the outlet funnel 24, for example into the displacement body 23a, with a gauge pressure of up to 500 mbar. The air will be referred to as secondary air in the following. The secondary air flows through the shaft furnace 10, in particular the shaft space 12, from the bottom upward in a vertical direction and in countercurrent to the material. The material inlet 16 at the same time represents, for example, an air outlet, more precisely an outlet for the total furnace offgas of the shaft furnace 10.

The shaft furnace 10 further comprises a plurality of burner lances 32, 34 which extend through the shaft wall 14 into the firing zone 20 of the shaft space 12. For example, the burner lances 32, 34 are arranged in two planes in FIG. 1, with the burner lances 32 of the upper plane having a first penetration depth into the shaft space 12 and the burner lances 34 of the lower plane having a second penetration depth into the shaft space 12. The first penetration depth of the burner lances 32 is preferably smaller than the second penetration depth of the burner lances 34 of the lower plane. It is likewise conceivable for the lower burner lances 34 to have a smaller penetration depth than the upper burner lances 32 arranged above them. The burner lances 34 having the second penetration depth are, for example, arranged entirely below the burner lances 32 having the first penetration depth. The burner lances 32, 34 each extend in the radial direction of the shaft space 12 into the latter, with the burner lances 34 penetrating more deeply extending, for example, over about two thirds of the radius of the shaft space 12. The burner lances 32 which penetrate less deeply extend, for example, over about one third of the radius of the shaft space 12. Gaseous, pulverulent or liquid fuel is introduced together with primary air into the firing zone 20 via the burner lances 32, 34. The different penetration depths of the burner lances 32, 34 lead to a different depth of the flames exiting from the burner lances 32, 34 within the firing zone 20 and thus ensure uniform heating of the material. A plurality of measurement probes for temperature measurement, which are not shown in FIG. 1, are preferably arranged over the cross section of the shaft space 12. A uniform temperature distribution over the cross section of the firing zone 20 can be checked by means of the temperature values measured in a plane of the firing zone 20. The temperature distribution can likewise be checked by means of targeted sampling of material at the discharge device 23, with samples of material from the inner region and the outer region of the shaft space 12 being checked.

The burner lances 32, 34 have, for example, a cooling jacket (not shown) for cooling a burner tube arranged within the cooling jacket. A cooling liquid preferably flows through the cooling jacket. It is likewise conceivable for the cooling jacket to be operated without a cooling liquid and be made of a heat-resistant material.

The shaft furnace 10 also comprises, for example, two primary air conduits 36, 38 for conveying air to the burner lances 32, 34. The primary air conduits 36, 38 are each connected to a fan 40, 42, preferably a compressor, so that the air is supplied through the primary air conduits 36, 38 in the direction of the burner lances. Each primary air conduit 36, 38 is connected to a respective ring conduit 44, 46 which respectively extends around the circumference of the shaft wall 14. The ring conduits 44, 46 are, for example, arranged above the burner lances 32, 34. Each ring conduit 44, 46 is connected to a plurality of burner lances 32, 34; in FIG. 1, the ring conduit 46 which is arranged above the ring conduit 44 is by way of example connected to the burner lances 34 having the greater penetration depth. For example, the shaft furnace comprises a first primary air conduit 36 which is connected to a first ring conduit 44. The lower, first ring conduit 44 is, for example, connected exclusively to the burner lances 32 having the first penetration depth, so that air flows through the first primary air conduit 36 into the first ring conduit 44 and to the burner lances 32 having the first, smaller penetration depth. The shaft furnace also comprises a second primary air conduit 38 which is connected to a second ring conduit 46. The upper, second ring conduit 46 is, for example, connected exclusively to the burner lances 34 having the second penetration depth, so that air flows through the second primary air conduit 38 into the second ring conduit 46 and to the burner lances 34 having the second, greater penetration depth. An oxygen conduit 52 having an oxygen inlet 48 is connected to the second primary air conduit 38. The oxygen conduit 52 comprises a valve 50 for regulating the amount of oxygen. The oxygen conduit 52 is connected to the second primary air conduit 38 so that oxygen flows into the second primary air conduit 38. The oxygen-enriched primary air flows through the second primary air conduit 38 into the upper, second ring conduit 46 and subsequently into the burner lances 34 having the second, greater penetration depth. The amount of oxygen flowing into the second primary air conduit 38 can be set via the valve 50. Primary air enriched with oxygen is fed exclusively to the burner lances 34 having the second penetration depth. The burner lances 32 having the first penetration depth are not connected to the oxygen inlet 48. The combustion air flowing through the second primary air conduit is preferably enriched with oxygen to such an extent that the mixture of air and oxygen has an oxygen content of from 40 to 90%.

It is likewise conceivable for the burner lances 32, 34 to be arranged in more than two planes or only in one plane, with, for example, burner lances 32 having the first penetration depth and burner lances 34 having the second penetration depth being arranged together in one plane. For example, the shaft furnace has three, four or five planes of burner lances 32, 34, with exclusively the burner lances 34 having the greatest penetration depth being connected to the oxygen conduit 52.

During operation of the shaft furnace 10, material to be fired is introduced via the material inlet 16 from above into the shaft space 12 and moves downward under the action of gravity in the vertical direction through the shaft space 12 in the direction of the discharge device 23. Secondary air or firing offgases flow in countercurrent to the material. The secondary air introduced from below through the air inlets 28, 30 into the shaft space 12 is used as combustion air in the firing zone and serves to burn a fuel, for example natural gas, heating oil or coil dust, introduced through the burner lances 32, 34 into the firing zone 20. The offgases of the combustion serve to preheat the material in the preheating zone 18 of the shaft space 12. After the preheating zone 18, the material enters the firing zone 20 and is fired, for example, calcined and/or sintered there. It is subsequently cooled by the secondary air in the cooling zone 22, with the secondary air heating up at the same time.

Figure 2:
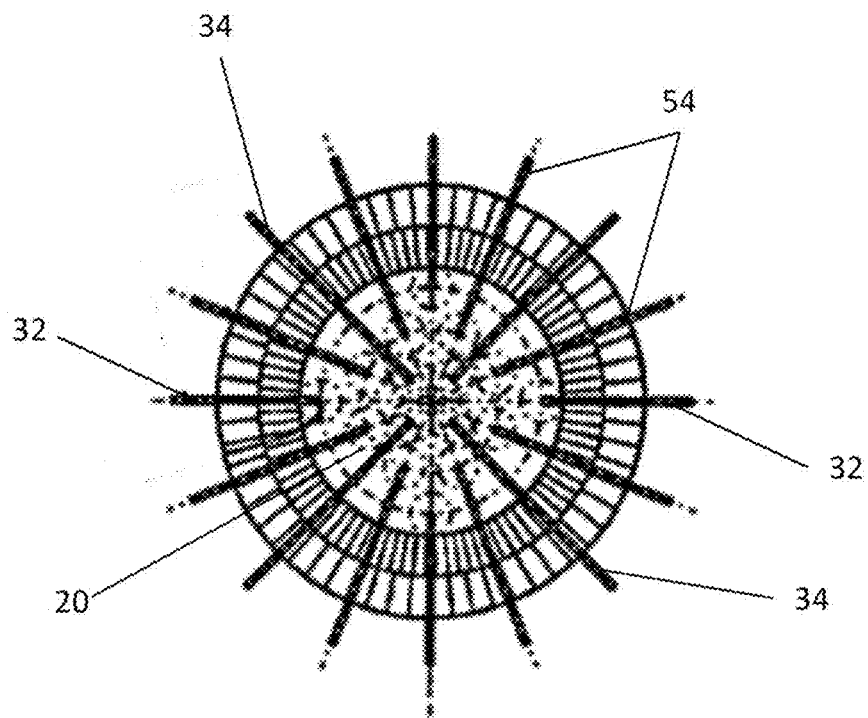
FIG. 2 is a schematic cross-sectional view of an example shaft furnace.
Figure 3:
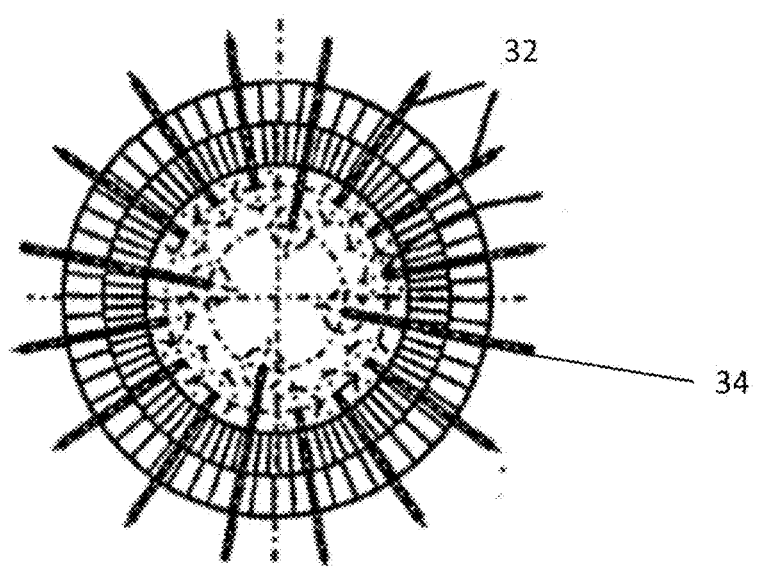
FIG. 3 is a schematic cross-sectional view of another example shaft furnace.

FIG. 2 and FIG. 3 each show a cross section through the shaft furnace 10 as depicted in FIG. 1, with different arrangements of burner lances 32, 34 being shown. FIG. 2 shows a plurality of burner lances 32 having a first penetration depth and a plurality of burner lances 34 having a second penetration depth which is greater than the first penetration depth. Furthermore, FIG. 2 also shows, by way of example, a plurality of burner lances 54 having a third penetration depth which is smaller than the second penetration depth and greater than the first penetration depth. The burner lances 32, 34, 54 are, for example, all arranged in one plane and offset relative to one another. For example, the different penetration depths of the burner lances 32, 34, 54 alternate regularly around the circumference of the firing zone 20.

For example, exclusively the burner lances 34 are connected to the oxygen conduit 52, and oxygen, especially oxygen-enriched primary air, is fed exclusively to the burner lances 34. It is also conceivable for oxygen to be fed to the burner lances 54 having the third, middle penetration depth, with the amount of oxygen fed to the burner lances 54 having the third penetration depth being able to be smaller than the amount of oxygen fed to the burner lances 34 having the second penetration depth. The greatest amount of oxygen is preferably fed to the burner lances having the greatest penetration depth. For example, the shaft furnace 10 has twelve burner lances 32 having the first penetration depth, four burner lances 34 having the second penetration depth and eight burner lances 54 having the third penetration depth in the sectional plane depicted in FIG. 1. This is merely illustrative, and any number of burner lances 32, 34, 54 having different penetration depths is conceivable. For example, the burner lances of the shaft furnace 10 have three, four or more different penetration depths, with the greatest amount of oxygen being fed to the burner lances having the greatest penetration depth. For example, the shaft furnace comprises a third primary air conduit which is connected to a further oxygen conduit. The third primary air conduit is preferably connected to a third ring conduit, with the third ring conduit being connected to the burner lances 54 having the third penetration depth, so that oxygen-enriched primary air flows through the third primary air conduit to the burner lances 54 having the third penetration depth.

FIG. 3 shows further working examples of the arrangement of the burner lances 32, 34 having the first and second penetration depths. For example, twelve burner lances 32 having the first penetration depth and four burner lances 34 having the second penetration depth are provided. The burner lances 34 having the second penetration depth are preferably supplied with oxygen-enriched primary air, with primary air without oxygen enrichment being supplied to the burner lances 32 having the first penetration depth, so that the primary air fed to the burner lances 32 having the first penetration depth has a lower proportion of oxygen than the primary air fed to the burner lances 34 having the second penetration depth.

Figure 4:
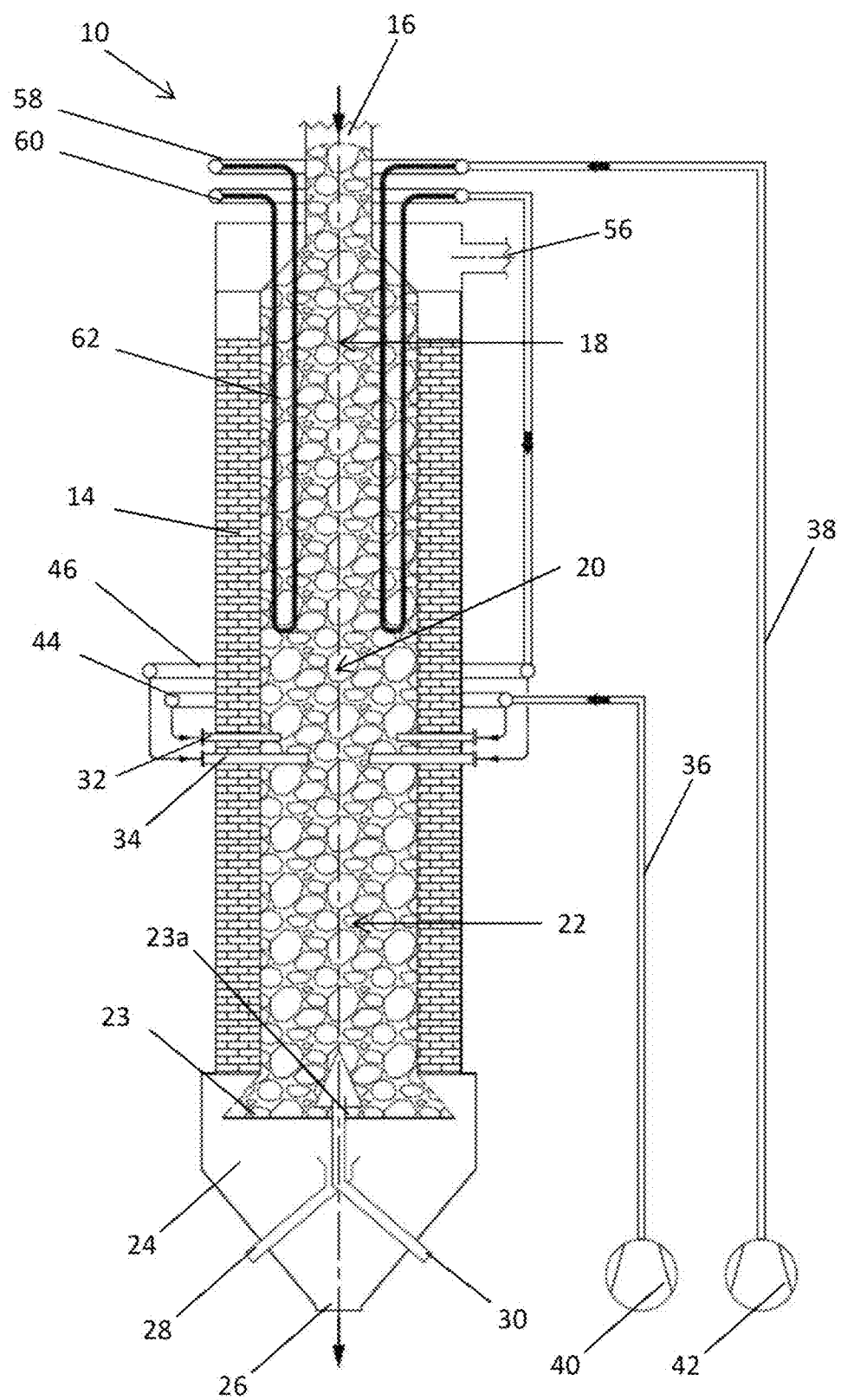
FIG. 4 is a schematic sectional view of still another example shaft furnace having primary air preheating.

FIG. 4 shows a shaft furnace 10 which corresponds at least largely to the shaft furnace 10 of FIG. 1, with identical elements being denoted by identical reference numerals. The shaft furnace 10 additionally comprises a gas outlet 56 for discharging the offgas from the shaft furnace 10. Such a gas outlet 56 is, for example, also present in the shaft furnace 10 of FIG. 1. In contrast to the shaft furnace of FIG. 1, the shaft furnace depicted in FIG. 4 comprises a second primary conduit 38 which partly runs through the preheating zone of the shaft space 12. The second primary air conduit 38 preferably comprises a first ring conduit 58 and a second ring conduit 60 arranged below the first ring conduit 58. The ring conduits 58, 60 are arranged around the outer circumference of the shaft space 12. The second primary air conduit comprises, for example, a plurality of immersion conduits 62 which are, for example, configured either with a U-shape or as double tube and extend from the first ring conduit 58 through the preheating zone 18 to the second ring conduit 60. The immersion conduits 62 preferably extend over part of the preheating zone 18 or the entire preheating zone 18. The second ring conduit 60 of the second primary air conduit 38 is connected to the ring conduit 46 so that preheated primary air flows to the burner lances 34 having the second penetration depth. The preheated primary air is preferably fed exclusively to the burner lances 34 having the second penetration depth.

During operation of the shaft furnace 10, part of the heat energy present in the combustion gases is used for heating the primary air, so that the preheated primary air is fed exclusively to the burner lances 34 having the second penetration depth. This heating of the primary air occurs within the shaft space 12 by the primary air being conveyed through immersion tubes 62 which dip into the firing material of the preheating zone 18 and are, for example, distributed, preferably uniformly, over the shaft space cross section in the circumferential direction of the shaft space 12. The immersion tubes 62 preferably have an identical configuration and are preferably arranged at equal distances from one another. The immersion tubes 62 preferably comprise a material which has a high thermal conductivity. The arrangement of the immersion tube 62 in the shaft space 12 in direct contact with the material being fired and the firing gases leads to particularly good heat transfer by thermal conduction, convection and thermal radiation. In addition, the heat exchange surfaces of the immersion tube 62 are automatically cleaned by the firing material flowing along them under the action of gravity.

A combination of the working example of FIGS. 1, 2, 3 and 4 is likewise conceivable. For example, the second primary air conduit 38 of FIG. 4 has an oxygen inlet for introducing oxygen into the second primary air conduit 38 so that oxygen-enriched and preheated primary combustion air is supplied to the burner lances 34 having the second penetration depth.

The cross sections of the shaft furnace 10 shown in FIGS. 2 and 3 can also be applied to the working example of the shaft furnace 10 depicted in FIG. 4, with, for example, primary air having a lower temperature compared to the primary air fed to the burner lances 34 having the second penetration depth being fed to the burner lances 54 having the third penetration depth. For example, primary air having a lower temperature compared to the primary air fed to the burner lances 34 having the second penetration depth is fed to the burner lances 54 having the third penetration depth.

LIST OF REFERENCE NUMERALS

10 Shaft furnace
12 Shaft space
14 Shaft wall
16 Material inlet
18 Preheating zone
20 Firing zone
22 Cooling zone
23 Discharge device
23a Displacement body
24 Outlet funnel
26 Material outlet
28 Air inlet
30 Air inlet
32 Burner lance having the first penetration depth
34 Burner lance having the second penetration depth
36 First primary air conduit
38 Second primary air conduit
40 Fan
42 Fan
44 Ring conduit
46 Ring conduit
48 Oxygen inlet
50 Valve
52 Oxygen conduit
54 Burner lance having the third penetration depth
56 Gas outlet
58 Ring conduit
60 Ring conduit
62 Immersion conduits

What is claimed is:

1. A shaft furnace for firing material that contains carbonate, the shaft furnace comprising:
in a flow direction of the material, a preheating zone, a firing zone, a cooling zone, and a material outlet for discharging the material;
burner lances that project into the firing zone, wherein a first of the burner lances has a first penetration depth into the firing zone and a second of the burner lances has a second penetration depth into the firing zone that is greater than the first penetration depth;
a first ring conduit that extends around a circumference of a shaft wall of the shaft furnace;
a second ring conduit that extends around the circumference of the shaft wall;
a first primary air conduit that conveys combustion air through the first primary air conduit, into the first ring conduit and into the first burner lance, and a second primary air conduit that conveys combustion air through the second primary air conduit, into the second ring conduit and into the second burner lance; and
an oxygen conduit that conveys oxygen into the firing zone, wherein the oxygen conduit is disposed such that oxygen flows from the oxygen conduit to the second burner lance, wherein the oxygen conduit is connected exclusively to the second primary air conduit so that oxygen is configured to flow from the oxygen conduit, through the second ring conduit and into the second primary air conduit.

2. The shaft furnace of claim 1 wherein the oxygen conduit is connected to the second burner lance so that oxygen for combustion of fuel is configured to flow into the second burner lance.

3. The shaft furnace of claim 1 wherein the oxygen conduit is connected exclusively to burner lances that have the second penetration depth.

4. The shaft furnace of claim 1 wherein the oxygen conduit comprises means for regulating an amount of oxygen flowing through the oxygen conduit.

5. The shaft furnace of claim 1 wherein the second ring conduit is positioned at a distinct and offset location around the shaft wall relative to the first ring conduit.

6. A shaft furnace for firing material containing carbonate, the shaft furnace comprising:
in a flow direction of the material, a preheating zone, a firing zone, a cooling zone, and a material outlet for discharging the material;
burner lances that project into the firing zone, wherein a first of the burner lances has a first penetration depth into the firing zone and a second of the burner lances has a second penetration depth into the firing zone that is greater than the first penetration depth;
a first ring conduit that extends around a circumference of a shaft wall of the shaft furnace;
a second ring conduit that extends around the circumference of the shaft wall;
a first primary air conduit that conveys primary combustion air through the first primary air conduit, into the first ring conduit and into the first burner lance; and a second primary air conduit that conveys primary combustion air through the second primary air conduit, into the second ring conduit and into the second burner lance, wherein the second primary air conduit extends at least partly through a preheating device that heats the primary combustion air in the second primary air conduit, wherein the primary combustion air conveyed by the first primary air conduit is not preheated by the preheating device.

7. The shaft furnace of claim 6 comprising an oxygen conduit for conveying oxygen into the firing zone, wherein the oxygen conduit is configured to carry oxygen to the second burner lance and a third of the burner lances that has a third penetration depth into the firing zone that is greater than the first penetration depth but less than the second penetration depth.

8. The shaft furnace of claim 7 wherein the oxygen conduit comprises means for regulating an amount of oxygen flowing through the oxygen conduit, wherein the means for regulating is configured such that the amount of oxygen configured to flow to the second burner lance is greater than an amount of oxygen configured to flow to the third burner lance.

9. The shaft furnace of claim 6 wherein the second primary air conduit is connected exclusively to the second burner lance so that preheated primary combustion air is configured to be fed exclusively to the second burner lance.

10. The shaft furnace of claim 6 comprising the preheating device, wherein the preheating device comprises a preheating zone within the shaft furnace, wherein the second primary air conduit runs at least partly through the preheating zone.

11. The shaft furnace of claim 10 wherein the second primary air conduit comprises immersion conduits that extend at least partly or completely through the preheating zone.

12. The shaft furnace of claim 6 wherein at least one of:
the first penetration depth is equal to or less than one third of a radius of the firing zone; or
the second penetration depth is about one third of the radius of the firing zone.

13. The shaft furnace of claim 6 wherein the second ring conduit is positioned at a distinct and offset location around the shaft wall relative to the first ring conduit.

14. A process for firing material that contains carbonate in a shaft furnace, the process comprising:
causing the material to flow through a preheating zone, a firing zone, and a cooling zone to a material outlet;
introducing fuel in the firing zone or adjacent thereto via burner lances, wherein a first of the burner lances has a first penetration depth and a second of the burner lances has a second penetration depth that is greater than the first penetration depth;
conveying primary combustion air through a first ring conduit that extends around a circumference of a shaft wall of the shaft furnace to the first of the burner lances; and
conveying oxygen along with the primary combustion air through a second ring conduit that extends around the circumference of the shaft wall to only the second of the burner lances that have the second penetration depth or conveying oxygen into a primary air conduit and through a second ring conduit that extends around the circumference of the shaft wall that conveys the primary combustion air only to the second of the burner lances that have the second penetration depth.

15. The process of claim 14 comprising enriching the primary combustion air with oxygen to have an oxygen content of 40% to 90%.

16. A process for firing material that contains carbonate in a shaft furnace, the process comprising:
causing the material to flow through a preheating zone, a firing zone, and a cooling zone;
directing fuel through (i) a first primary air conduit that conveys the fuel through a first ring conduit that extends around a circumference of a shaft wall of the shaft furnace; and (ii) a second primary air conduit that conveys the fuel through a second ring conduit that extends around the circumference of the shaft wall;
introducing fuel in the firing zone or adjacent thereto via burner lances, wherein a first of the burner lances, receives fuel from the first ring conduit and has a first penetration depth and a second of the burner lances, receives fuel from the second ring conduit and has a second penetration depth that is greater than the first penetration depth; and
conveying primary combustion air that has been preheated exclusively to burner lances that have the second penetration depth.

17. The process of claim 16 comprising preheating the primary combustion air to a temperature of 250° C. to 500° C.

* * * * *